United States Patent
van der Wansem et al.

[11] Patent Number: 5,223,296
[45] Date of Patent: Jun. 29, 1993

[54] APPARATUS AND METHODS FOR FORMING EXTRUDATES

[75] Inventors: Martin F. J. van der Wansem, Kalverdijk; Ferry C. Horn, Grootebroek, both of Netherlands

[73] Assignee: General Mills, Inc., Minneapolis, Minn.

[21] Appl. No.: 886,913

[22] Filed: May 22, 1992

[51] Int. Cl.⁵ .............. A21C 3/00; A21D 6/00; A23P 1/00
[52] U.S. Cl. .................. 426/496; 425/377; 425/380; 425/382 R; 425/464; 426/502; 426/516; 426/517
[58] Field of Search ........... 426/496, 502, 503, 516, 426/517; 425/461, 463, 464, 380, 382 R, 377; 264/211.23

[56] References Cited

U.S. PATENT DOCUMENTS

| | | | |
|---|---|---|---|
| 3,061,440 | 10/1962 | Johannes | 426/517 |
| 3,340,572 | 9/1967 | Lurie | 425/464 |
| 3,551,165 | 12/1970 | Reesman et al. | 426/516 |
| 3,586,517 | 6/1971 | La Warre et al. | 425/464 |
| 3,847,531 | 11/1974 | McComb | 425/464 |
| 4,383,817 | 5/1983 | Mirhej | 425/464 |
| 4,384,842 | 5/1983 | Cavalli | 426/516 |
| 4,395,217 | 7/1983 | Benadi' | 425/382 R |
| 4,445,838 | 5/1984 | Groff | 425/382 R |
| 4,557,940 | 12/1985 | Suzuki | 426/517 |
| 4,567,051 | 1/1986 | Baker et al. | 426/516 |
| 4,614,489 | 9/1986 | Juravic | 425/464 |
| 4,770,622 | 9/1988 | Schnee et al. | 425/383 |
| 4,790,996 | 12/1988 | Roush et al. | 426/516 |

*Primary Examiner*—George Yeung
*Attorney, Agent, or Firm*—L. MeRoy Lillehaugen; John A. O'Toole; Alan D. Kamrath

[57] ABSTRACT

An apparatus (10) is disclosed for simultaneously forming two dough sheets from a single cooker extruder (12), with the dough sheets each being formed by a plurality of dough ropes which are guided by guide posts (44) at equally spaced intervals on a conveyor (16) for passing between the pressing rollers (42) of a sheeting device (18). Specifically, the die (24) attached to the die head (20) of the cooker extruder (12) includes a roof-shaped extension formed by first and second die plates (26) interconnected by their front edges at an obtuse angle. Top and bottom pates (28) are interconnected to the top and bottom edges of the die plates (26). The back edges of the die plates (26) and of the top and bottom plates (28) are interconnected to an annular connection plate (30) which is attached to the die head (20) by bolts (34) passing through counterbored bores (32) in the connection plate (30) and threaded into the die head (20). The die plates (26) have a constant and equal thickness and each include four extrusion apertures (36) extending generally perpendicularly therethrough and arranged in the corners of a square configuration generally parallel to and spaced from the edges of the die plates (26).

20 Claims, 2 Drawing Sheets

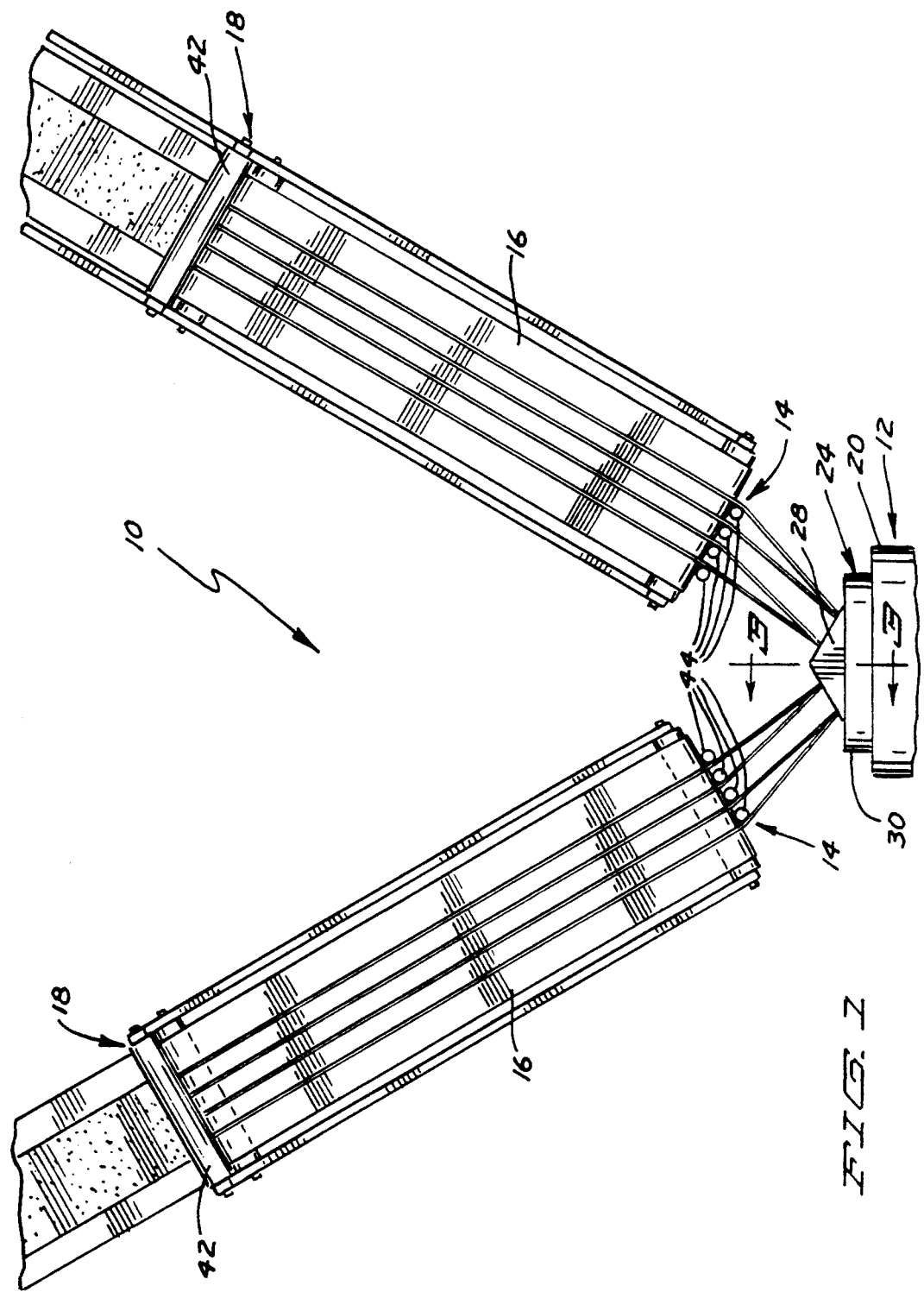

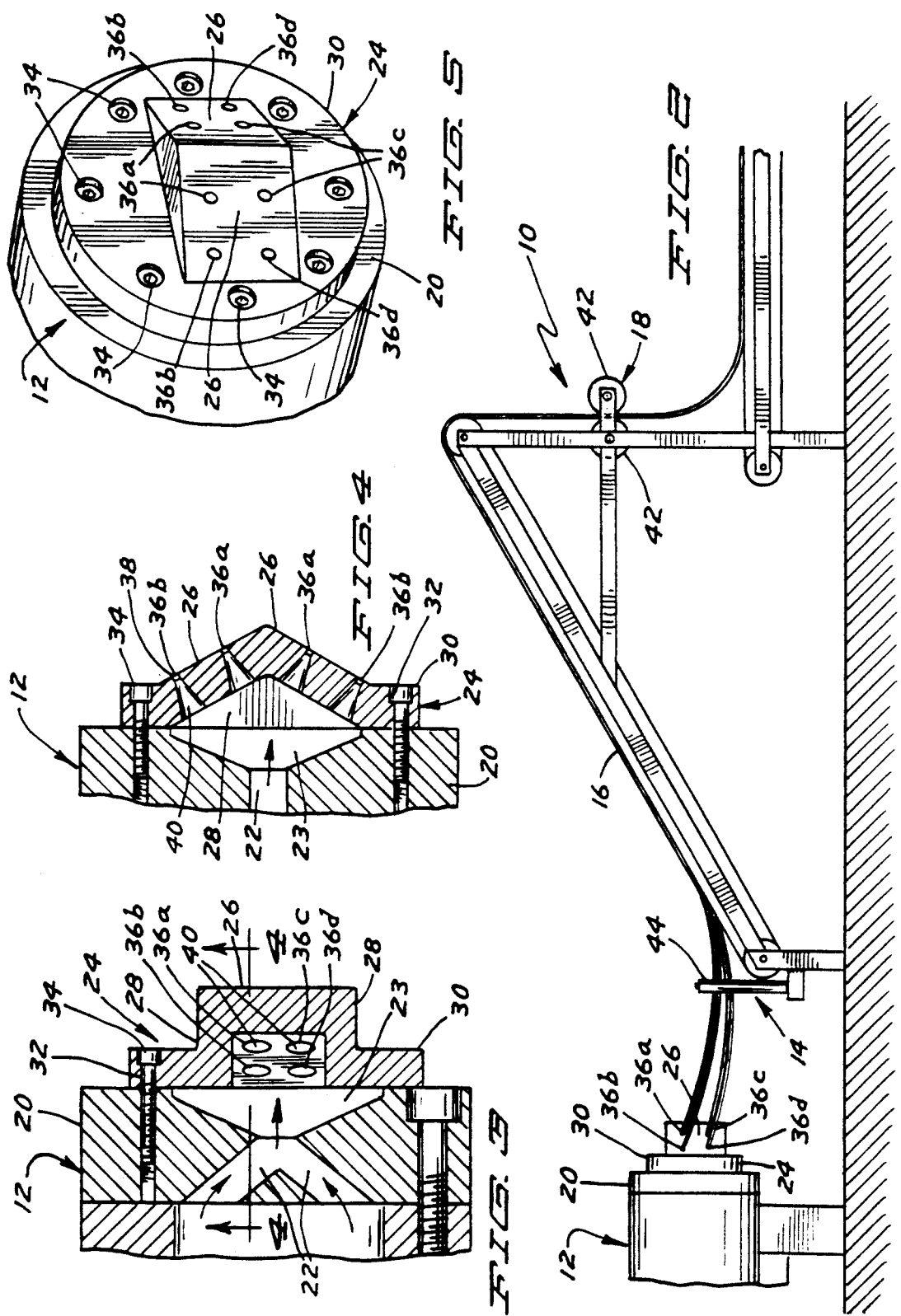

APPARATUS AND METHODS FOR FORMING EXTRUDATES

BACKGROUND

The present invention generally relates to apparatus and methods for forming first and second, continuous, independent, extrudates, and particularly to apparatus and methods for simultaneously forming two dough sheets from a single cooker extruder for the preparation of a snack product by conventional deep fat frying.

One type of snack product which has gained wide market acceptance is the "puffed" snack product. In certain methods of preparation, a cooked farinaceous dough is formed into a single continuous dough sheet. This dough sheet is then run through a piece forming apparatus which includes an opposed pair of rollers at least one of which has depressions which stamp out the desired shape and size pieces from the dough sheet. After formation of the dough pieces, the pieces are dried under controlled conditions from a moisture content of about 18% down to a moisture content of between 10% and 15% to form a half product or pellet. The moisture content of the half product is sufficiently low to exhibit extended shelf stability. The snack product is prepared from the half product by conventional deep fat frying. The frying of the half product generates steam volumes inside of the half product to puff the half product resulting in a light, puffed snack product having surface corrugations.

The sale of snack food products is a highly competitive business. The novelty of snack food products decline rapidly, as new and different types of snack foods are introduced to maintain or increase market share. Puffed snack products can be varied in various ways such as by changing the shapes, sizes, and surface corrugations of the pieces or by changing the composition of the dough from which the half products are prepared. Another variation is to have the puffed snack product of a hollow structure, with the hollow configuration resulting from the fabrication of the half products from a two-layer laminated dough sheet. One method of forming a laminated dough sheet is to fold a single continuous dough sheet into a two-plied dough sheet as set forth in U.S. application No. 699,039 filed May 13, 1991, now U.S. Pat. No. 5,092,757.

The continuous dough sheet is often formed by passing a plurality (such as 4) of spaced ropes of dough between sheet pressing rollers. The spaced ropes of dough are extruded from a cooker extruder onto a conveyor which delivers the ropes of dough to the sheet pressing rollers. Generally, the dough ropes are formed by forcing the dough through a die plate including extrusion apertures. The formation of the dough sheet from a plurality of spaced ropes rather than passing a single amount of dough between the sheet pressing rollers forms a more uniform sheet resulting in more uniform half product pieces and more uniform puffed snack pieces. Additionally, the formation of the dough sheet from a plurality of spaced ropes rather than passing a single amount of dough between the sheet pressing rollers better dissipates heat along the sheet pressing rollers. However, the formation of such a dough sheet continuously from a plurality of dough ropes presents many problems. In particular, it should be appreciated that the ropes of dough have to be generally uniformly spaced on the conveyor and into the sheet pressing rollers. Further, a common problem is that the dough ropes will break causing the ropes of dough to fall on the floor and/or become entangled with each other. Further, the cooker extruder is a relatively expensive piece of equipment which has the capacity to supply ropes of dough for more than one sheet and in fact the consistency of the dough produced by the cooker extruder may in fact increase with the production of dough for more than one sheet from the same cooker extruder. However, it can be appreciated that additional problems arise from attempting to simultaneously extrude dough ropes for two dough sheets. Particularly, in addition to preventing consistent production for one sheet, breakage of one or more dough ropes for one of the sheets may detrimentally effect the consistent production of the other sheet, for example, the ropes of dough for one sheet becoming entangled in the ropes of dough for the other sheet. Further, factors such as unequal pressure drop through the respective die channels, the length of the channels, and the like affect the uniformity and consistency of the dough ropes which in turn affect the uniformity and consistency of the dough sheet, the half products, and the puffed snack products.

Accordingly, it is an object of the present invention to provide novel apparatus and methods for the simultaneous formation of two continuous dough sheets from a single cooker extruder.

Another object of the present invention is to provide such novel apparatus and methods where the ropes of dough extruded from the cooker extruder are directed at a non-parallel angle to reduce operational failure of the formation of one sheet from detrimentally affecting the formation of the other sheet.

Yet another object of the present invention is to provide such novel apparatus and methods where the ropes of dough are uniformally and consistently extruded.

SUMMARY

Surprisingly, the above objectives can be satisfied in the field of puffed snack product fabrication by providing, in the preferred form, apparatus and methods of forming first and second continuous dough sheets from a single cooker extruder where first and second groups of a plurality of dough ropes are simultaneously extruded at a non-parallel angle to prevent entanglement of the dough ropes of one group with the dough ropes of the other group and are simultaneously guided at equally spaced intervals onto respective conveyors where the dough ropes are conveyed to respective sheeting devices and sheeted into first and second dough sheets.

In a preferred aspect of the present invention, a die for the cooker extruder is provided including first and second die plates integrally connected by their front edges at an obtuse angle, with each of the die plates including a plurality of extrusion apertures corresponding to the number of dough ropes in each group and through which the dough is extruded from the cooker extruder.

The present invention will become clearer in light of the following detailed description of an illustrative embodiment of this invention described in connection with the drawings.

DESCRIPTION OF THE DRAWINGS

FIG. 1 shows a top plan view of an apparatus for simultaneously forming two continuous dough sheets from a single cooker extruder according to the preferred teachings of the present invention.

FIG. 2 shows a side elevational view of the apparatus of FIG. 1.

FIG. 3 shows a cross-sectional view of the apparatus of FIG. 1 according to section line 3—3 of FIG. 1.

FIG. 4 shows a cross-sectional view of the apparatus of FIG. 1 according to section line 4—4 of FIG. 3.

FIG. 5 shows a perspective view of the die of the cooker extruder of the apparatus of FIG. 1.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "lower", "upper", "end", "face", "edge", "front", "back", "top", "bottom", and similar terms are used herein, it should be understood that these terms have reference only to the structure shown in the drawings as it would appear to a person viewing the drawings and are utilized only to facilitate describing the invention.

DESCRIPTION

Referring now to the drawings and in particular to FIGS. 1 and 2, an apparatus utilizing the present methods for forming first and second sheets according to the preferred teachings of the present invention is shown and generally designated 10. Particularly, apparatus 10 of the preferred form generally includes a single extruder 12, first and second guides 14, first and second conveyors 16, and first and second sheeting devices 18. In the preferred form where the extrudate is in the form of dough, extruder 12 is a cooker extruder and can be of any standard type such as a twin-screw cooker extruder manufactured by Clextral, Buehler, APV Baker, or Werner & Pfleiderer. Twin-screw cooker extruders 12 include a die head 20 having first and second, converging passages 22 that combine dough from both screw flows and then redistributes the dough evenly to a die 24. Specifically, passages 22 converge into a single opening located inside of die head 20. A funnel-shaped distribution cavity 23 extends from the face of die head 20 adjacent die 24 and intersects with the intersection opening of passages 22, with distribution cavity 23 having a circular cross-section at the face of die head 20 of a diameter and size a multiple of the diameter and size of passages 22 and their intersection opening. Experience shows that more uniform products are produced using the converging passages 22 that combine dough from both screw flows.

According to the teachings of the present invention, die 24 is of an improved design for extruding first and second groups of a plurality of uniform and consistent ropes of dough at a non-parallel angle to each other. Specifically, die 24 includes first and second die plates 26 of equal size and having their front side edges integrally interconnected at an obtuse angle in the order of 120° in the preferred form. Triangular-shaped, top and bottom closure plates 28 are integrally connected to the top and bottom edges of plates 26, respectively, with plates 28 extending generally perpendicular to plates 26. The back edges of plates 26 and 28 are integrally interconnected to an annular connection plate 30, with connection plate 30 having a cylindrical periphery in the preferred form. Plates 26 extend at an acute angle from plate 30 in the order of 30° in the preferred form while plates 28 extend generally perpendicular to plate 30. Die 24 can be attached to head 20 by any suitable manner such as counterbored bores 32 extending through plate 30 radially outside of plates 26 and 28 (with 8 bores 32 shown) for receipt of bolts 34 threadably received in head 20. Plates 26 have constant thickness and are each generally square in shape having lengths along an edge generally equal to one-half the diameter of cavity 23 at the face of die head 20, with plates 26 and 28 being generally centered in cavity 23. The spacing between the back edges of plates 26 is generally equal to the diameter of cavity 23 at the face of die head 20 and preferably slightly smaller. In the preferred form, the intersection opening of passages 22 is generally parallel to the front and back edges of plates 26 and perpendicular to the top and bottom edges of plates 26.

Each of plates 26 includes a plurality of parallel, extrusion apertures 36 shown as four in the preferred form arranged in a top pair of apertures 36a and 36b in the same horizontal plane arranged over a bottom pair of apertures 36c and 36d in the same horizontal plane, with the first extrusion apertures 36a and 36c of each pair being in the same vertical plane and spaced from the front edges an equal distance and the second extrusion apertures 36b and 36d of each pair being in the same vertical plane and spaced from the front edges an equal distance greater than the spacing of the first extrusion apertures 36a and 36c of each pair from the front edges. Particularly, the spacing between the centers of apertures 36a and 36b and between apertures 36c and 36d is generally equal to the spacing between the centers of the top and bottom pairs of apertures 36a and 36b and 36c and 36d, respectively, and in the most preferred form the spacing between the center of the top and bottom pairs of apertures 36a and 36b and 36c and 36d, respectively, being slightly less than the spacing between the centers of apertures 36a and 36b and of apertures 36c and 36d in each pair. Further in the preferred form, the centers of the top pairs of apertures 36a and 36b are spaced from the top edges and the centers of the bottom pairs of apertures 36c and 36d are spaced from the bottom edges of plates 26 the same distance which is less than one-half the spacing between the pairs of apertures 36a and 36b and apertures 36c and 36d. Similarly, the centers of the first apertures 36a and 36c of each pair of plates 26 are spaced from the front edges of plates 26 a distance substantially greater than the centers of the second apertures 36b and 36d of each pair of plates 26 are spaced from the back edges of plates 26.

The centers of extrusion apertures 36 extend generally perpendicular to the inner and outer faces of die plates 26. Each of apertures 36 have a generally circular cross-section including a first portion 38 of a generally constant cross-section and extending from the outer face of plates 26 for approximately 10% of the thickness of plates 26 and a second portion 40 extending from first portion 38 to the inner face of plates 26 and of an expanding cross-section and particularly expanding at an angle of 5° from portion 38.

Sheeting devices 18 each include first and second horizontally arranged pressing rollers 42 which abut together and are rotated in opposite directions. Conveyors 16 extend at an upward incline above pressing rollers 42 with the dough ropes falling vertically by gravity from conveyors 16 to the nip of pressing rollers 42. Sheets formed by pressing rollers 42 extend vertically downward by gravity onto a conveyor which conveys the sheets to the next processing step.

Guides 14 are shown in the most preferred form as guide posts 44 equal in number to the number of apertures 36 in each die plate 26 (with four shown in the preferred form) mounted to the frame of each conveyor 16 opposite sheeting device 18. Guide posts 44 are generally equally spaced along the width of each conveyor 16. In the preferred form, guide posts 44 are formed of heat-resistant plastic that doesn't deform such as DELRIN ™ made by Dupont.

In operation, extrudate in the form of dough is extruded from cooker extruder 12 through passages 22 and which combines in distribution cavity 23. From cavity 23, the dough flows into the roof-shaped extension formed by plates 26 and 28 of die 24 which is in fluid communication and extends outwardly from distribution cavity 23. The dough then flows from the roof-shaped extension initially into second portions 40 and then through first portions 38 of each of the four apertures 36 in both plates 26. It can then be appreciated that the dough forced through apertures 36 is extruded in the form of first and second groups of four continuous ropes which extend generally parallel to each other in each group but with the groups extending in two different directions at a non-parallel angle in the order of 60° in the preferred form from each plate 26. The first and second groups of dough ropes extruded from the first and second die plates 26 simultaneously extend to guide posts 44 of the first and second guides 14, respectively, where the ropes of dough simultaneously pass around guide posts 44 and are guided onto the first and second conveyors 16, respectively. The ropes of dough are then simultaneously conveyed on conveyors 16 to the respective sheeting devices 18 where they simultaneously pass between press rollers 42 and are formed into first and second sheets. Guide posts 44 ensure positioning of the ropes of dough on conveyor 16 at equally spaced intervals so that the dough is distributed evenly over the full width of press rollers 42 after it passes through sheeting devices 18.

It can then be appreciated that apparatus 10 according to the preferred teachings of the present invention allows for the simultaneous formation of two continuous dough sheets from a single cooker extruder 12. It should further be noted that the ropes of dough for each of the dough sheets are simultaneously extruded from cooker extruder 12 at a non-parallel angle (60° in the preferred form) so that operational failure of the formation of one sheet does not detrimentally affect the formation of the other sheet. For example, a dough rope for one of the sheets may become entangled with the other ropes being extruded through the same plate 26 forming that sheet as is common in current apparatus but is unlikely to becoming entangled in the ropes forming the other sheet being extruded through apertures 36 of the other plate 26. Thus, a disturbance in the formation of one sheet no longer influences the formation of the other sheet. Further, the non-parallel angle of the groups of dough ropes allow the physical placement of conveyors 16, guide posts 44, and sheeting devices 18 at the same level and adjacent to each other.

Also, die 24 according to the teachings of the present invention extrudes dough ropes at uniform and consistent flows. Specifically, die plates 26 and apertures 36 of the preferred form are arranged in a manner which are particularly advantageous. Specifically, apertures 36 of die plates 26 are of the same length, which is equal to the thickness of die plates 26 since apertures 36 extend generally perpendicular to the inner and outer faces of die plates 26. It should be recognized that the length of the extrusion apertures is important in that the longer the flow path from cooker extruder 12 to the outside face of the die, more resistance to flow and less control of that flow exists producing nonuniformity. It should further be appreciated that the equal length of apertures 36, the arrangement of apertures 36 in each of plates 26, and the arrangement of plates 26 relative to each other insures that there is an equal pressure drop through apertures 36, with apertures 36 being generally equally spaced from the center of dough flow, to produce uniform and consistent dough ropes and without the necessity of adjustment valves which add to the cost and complexity of the apparatus and which also can have a negative impact on the consistency of the dough. It should be further noted that the uniformity and consistency of the dough is more of a problem in the production of snack products of the present invention than in other food production fields such as graham crackers where the dough is cooked to a greater degree and tends to be dryer and sheeted in thicker sheets.

It should also be noted that if it is desired to form a single dough sheet from cooker extruder 12, apparatus 10 of the present invention can be quickly converted to be of the type of prior apparatus. Specifically, die 24 can be replaced with a prior die for extruding four dough ropes which are guided by the first guide 14 onto the first conveyor 16 and into first sheeting device 18, with the second guide 14, second conveyor 16, and second sheeting device 18 being idled until it is again desired to simultaneously form two dough sheets.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. For use with a single extruder for extruding extrudate including a die head having a distribution cavity, apparatus comprising, in combination: a die, with the die including first and second die plates, with each of the die plates having front and back edges and being of a constant thickness, with the die plates being integrally connected about their front edges at an obtuse angle relative to each other; means for attaching the first and second die plates to the die head with the first and second die plates forming a roof-shaped extension in fluid communication and extending outwardly from the distribution cavity of the die head; and a plurality of extrusion apertures extending through each of the first and second die plates spaced from the front and back edges and through which the extrudate flows from the roof-shaped extension.

2. The apparatus of claim 1 wherein the attaching means comprises, in combination: an annular connection plate, with the back edges of the first and second die plates being connected to the connection plate with the first and second die plates extending at an acute angle from the connection plate; and means for attaching the connection plate to the die head.

3. The apparatus of claim 2 further comprising, in combination: first and second, triangular-shaped, top and bottom closure plates connected to the top and bottom edges of the first and second die plates and to the connection plate generally perpendicular thereto.

4. The apparatus of claim 3 wherein first, second, third, and fourth extrusion apertures are located in each of the first and second die plates, with the first and second extrusion apertures being spaced from the front edges an equal distance, with the third and fourth extrusion apertures being spaced from the front edges an equal distance, with the first and third and the second and fourth extrusion apertures being spaced from each other an equal distance.

5. The apparatus of claim 4 wherein the first and second extrusion apertures are spaced from the front edges a distance substantially greater than the third and fourth extrusion apertures are spaced from the back edges of the die plates.

6. The apparatus of claim 5 wherein the first and third extrusion apertures are spaced from the top edges a distance generally equal to the spacing of the second and fourth extrusion apertures from the bottom edges of the first and second die plates and which is less than one-half of the spacing between the first and second extrusion apertures.

7. The apparatus of claim 6 wherein the centers of the extrusion apertures extend generally perpendicular to the inner and outer faces of the first and second die plates.

8. The apparatus of claim 7 wherein each of the extrusion apertures comprises a first portion of a generally constant cross-section extending from the outer face part way through the thickness of the die plates and a second portion extending from the first portion to the inner face of the die plates of an expanding cross-section.

9. The apparatus of claim 8 further comprising, in combination: first and second sheeting devices; first means for guiding the extrudate extruded through the extrusion apertures of the first die plate to the first sheeting device at equally spaced intervals; and second means for guiding the extrudate extruded through the extrusion apertures of the second die plate to the second sheeting device at equally spaced intervals, with the apparatus simultaneously forming two sheets.

10. The apparatus of claim 9 wherein the guiding means each include a conveyor for conveying the extrudate to the sheeting device and guide posts mounted to the conveyor opposite the sheeting device for guiding the extrudate from the die plate to the conveyor.

11. The apparatus of claim 1 further comprising, in combination: first and second sheeting devices; first means for guiding the extrudate extruded through the extrusion apertures of the first die plate to the first sheeting device at equally spaced intervals; and second means for guiding the extrudate extruded through the extrusion apertures of the second die plate to the second sheeting device at equally spaced intervals, with the apparatus simultaneously forming two sheets.

12. The apparatus of claim 11 wherein the guiding means each include a conveyor for conveying the extrudate to the sheeting device and guide posts mounted to the conveyor opposite the sheeting device for guiding the extrudate from the die plate to the conveyor.

13. The apparatus of claim 1 wherein first, second, third, and fourth extrusion apertures are located in each of the first and second die plates, with the first and second extrusion apertures being spaced from the front edges an equal distance, with the third and fourth extrusion apertures being spaced from the front edges an equal distance, with the first and third and the second and fourth extrusion apertures being spaced from each other an equal distance.

14. The apparatus of claim 13 wherein the first and second extrusion apertures are spaced from the front edges a distance substantially greater than the third and fourth extrusion apertures are spaced from the back edges of the die plates.

15. The apparatus of claim 14 wherein the first and third extrusion apertures are spaced from the top edges a distance generally equal to the spacing of the second and fourth extrusion apertures from the bottom edges of the first and second die plates and which is less than one-half of the spacing between the first and second extrusion apertures.

16. Method for simultaneously forming two sheets from extrudate comprising the steps of: simultaneously extruding first and second groups of extrudate ropes from a single extruder, with each of the groups including a plurality of extrudate ropes, with the first and second groups of extrudate ropes extending at a nonparallel angle relative to each other and in the order to prevent operational failure of the extrusion of one of the first and second groups from detrimentally affecting the extrusion of the other of the first and second groups; simultaneously guiding the extrudate ropes of the first group onto a first conveyor at equally spaced intervals on the first conveyor and guiding the extrudate ropes of the second group onto a second conveyor at equally spaced intervals on the second conveyor; simultaneously conveying the extrudate ropes of the first and second groups on the first and second conveyors; and simultaneously pressing the extrudate ropes of the first group into a first sheet and pressing the extrudate ropes of the second group into a second sheet.

17. The method of claim 16 wherein the extruding step comprises the step of extruding the extrudate ropes parallel to each other in the first and second groups and with the non-parallel angle of the first and second groups being in the order of 60°.

18. The method of claim 17 wherein the extruding step comprises the step of extruding first and second groups of first, second, third, and fourth extrudate ropes, with the first and third and the second and fourth extrudate ropes being in the same vertical planes and the first and third and the second and fourth being in the same horizontal planes.

19. The method of claim 18 wherein the extruding step comprises the steps of: providing a die on the single extruder, with the die comprising, in combination: first and second die plates, with each of the die plates having front and back edges and being of a constant thickness, with the die plates being integrally connected about their front edges at an obtuse angle relative to each other and forming a roof-shaped extension, and a plurality of extrusion apertures extending through each of the first and second die plates spaced from the front and back edges and through which the extrudate flows from the roof-shaped extension; and simultaneously extruding the extrudate through the extrusion apertures of the first and second die plates.

20. The method of claim 16 wherein the guiding step comprises the steps of: providing a plurality of guide posts mounted to the conveyor; and passing one of the extrudate ropes around one of the guide posts and onto the conveyor.

* * * * *